United States Patent [19]

Kensaku et al.

[11] 3,938,609
[45] Feb. 17, 1976

[54] TRICYCLE

[75] Inventors: Yano Kensaku, Kawanishi; Kurose Makoto, Toyonaka; Nagamitsu Toshiaki, Ikeda, all of Japan

[73] Assignee: Daihatsu Motor Company Limited, Osaka, Japan

[22] Filed: Jan. 17, 1975

[21] Appl. No.: 541,940

[30] Foreign Application Priority Data
Jan. 28, 1974 Japan................................ 49-12111
July 15, 1974 Japan................................ 49-81505

[52] U.S. Cl................... 180/27; 280/112 R; 267/57
[51] Int. Cl.²...................... B60G 9/02; B60G 11/60
[58] Field of Search....... 180/27; 280/112 R, 112 A, 280/111; 267/57

[56] References Cited
UNITED STATES PATENTS

| | | | |
|---|---|---|---|
| 2,221,196 | 11/1940 | Kldvik | 280/112 R |
| 2,819,093 | 1/1958 | Geiser | 180/27 X |
| 3,504,934 | 4/1970 | Wallis | 280/112 R X |
| 3,583,727 | 6/1971 | Wallis | 280/112 A X |

FOREIGN PATENTS OR APPLICATIONS

1,471,948   1/1967   France ........................... 280/112 R

*Primary Examiner*—Kenneth H. Betts
*Attorney, Agent, or Firm*—Pierce, Scheffler & Parker

[57] ABSTRACT

A tricycle having a front and a rear frame swingingly connected with each other in an axis line longitudinal of a tricycle body and providing between both frames an elastic member serving to restore the front frame when it is leaned against the rear frame, which is adapted to make zero or minimum the increasing ratio of restoring force of the elastic member when the front frame is leaned under the predetermined angle of inclination, while, large when over the same angle, whereby the tricycle is made safe and improved in a turning efficiency.

19 Claims, 10 Drawing Figures

TRICYCLE

This invention relates to a front frame leaning type tricycle having a front frame supporting one front wheel and a rear frame supporting two rear wheels, in which both frames are connected with each other in the relationship that the former may be swingingly movable against the latter in an axis line extending longitudinally of the tricycle body.

A tricycle of this kind is conventionally so constructed that a front frame is swingingly movably connected with a rear frame so that a rider may naturally lean himself inwardly of the curve for improving the turning of tricycles as the same as bicycles when a turn is made. In such construction, the tricycle has the tendency that when a turn is made the rear frame is liable to lean inwardly of the curve from the effect of centrifugal force applied thereto so as to allow one of rear wheels inside the curve to be raised. For preventing this, an elastic member is provided between the front and the rear frame. In this instance, when an elastic member of a large elasticity, i.e., of a large elastically restoring force, is used for this purpose, the front frame cannot be swingingly movable without any interruption owing to a large resistance applied thereto when a turn is made, and also a rider must steer the tricycle by more steeply leaning himself to keep the balance with a large restoring force of the elastic member as aforegoing. Namely, the front frame is required to be more largely leaned correspondingly to the elastic reaction of elastic member in comparison with no provision of any elastic one, whereby the tricycle becomes hard to be turned in running as quickly as a conventional bicycle resulting in worsening as a whole the turning efficiency of the same. While, the elastic member of a relatively small restoring force is used for allowing the front frame to be smoothly swingingly movable, on the other hand, when a turn is made the rear frame is liable to be leaned outwardly of the curve from the effect of centrifugal force applied thereto so that one rear wheel inside the curve tends to lift from the ground. As a result, the faster is the running speed or the smaller the radius of curve, the larger becomes the centrifugal force applied to the rear frame; consequently, leading to overturn of the tricycle. Especially, having a small elastic restoring force (the elasticity), the elastic member absorbs most of the inclination of the rear frame and scarcely transmits it to the front frame. Resultantly, the rider cannot accurately catch the rear frame inclination so severe as to occur overturn of the tricycle.

Conventionally, the elastic member has been formed to have a spring constant settled at a uniformally predetermined value so that the tricycle might be improved in the turning efficiency and the anti-overturn capability when a turn is made, however, these turning efficiency and the anti-overturn capability are contrary as aforegoing to result in that both have not been fully improved. While, this kind of tricycle widely employs a motor or pedals for driving only one of rear wheels, so-called single wheel driven system, in order to simplifying the tricycle construction, wherein the tricycle body tends to turn toward non-driven rear wheel side. Accordingly, in case the spring characteristics of elastic member provided between the front and the rear frame are assumed to be equal at the right and left side of both frames, namely, to be equal when the front frame is leaned toward a driven rear wheel and non-driven one, the front frame should be leaned toward the driven rear wheel side more than non-driven one side, whereby there is a defect that a rider has a feeling that he steers the tricycle differentially left and right when a turn is made.

The present invention has been designed to eliminate the abovementioned drawbacks. A main object of the invention is the provision of a tricycle of front frame leaning type which is adapted to be exactly prevented from overturn caused by rise of one rear wheel inwardly of the curve when a turn is made so that the tricycle may be improved in the anti-overturn capability, at the same time, a front frame may be extremely easily swingingly movable so that the same may be turned in running without any interruption. Another object of the invention is the provision of a tricycle of front frame leaning type which enables a rider to steer the bicycle extremely easily in a feeling that he steers the tricycle equally in the left or the right turn in spite of the single rear wheel driven system.

Also, the invention is characterized in that firstly an elastic member insertibly mounted between a front and a rear frame of the tricycle is made to have the non-linear feature, that is, have the elastic restoring force of the same which becomes zero or minimum within the predetermined range and enough larger over the same range with respect to the displacement of elastic member, secondly the elastic member is made to have a small elastic restoring force when the front frame swingingly leans toward one rear wheel cooperably connected to a prime mover, conversely, have a large restoring force when the front frame leans toward the opposite side of the driven rear wheel.

The above-mentioned and other objects of the invention will be apparent from the description hereinafter and characteristics thereof will be clearly understood in accordance with embodiments shown in the accompanying drawings, in which.

Figure 1:
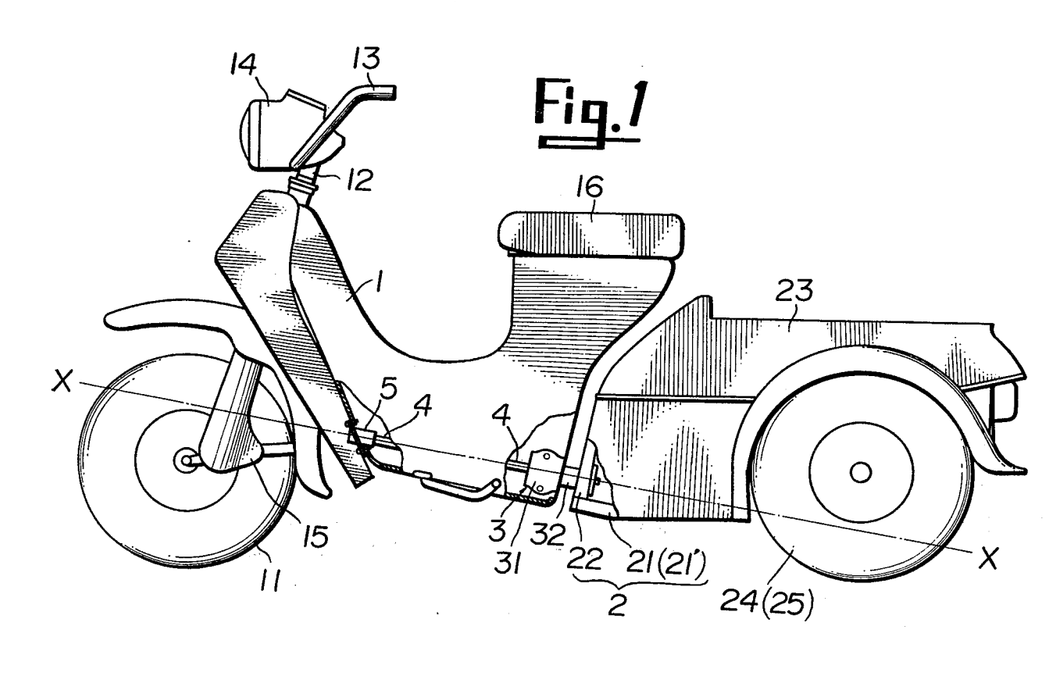
FIG. 1 is a partially cutaway side view of the invention.

Referring to FIG. 1, the reference numeral 1 designates a front frame having one front wheel 11 of a tricycle, which supports a handle post 12 at the foremost end thereof. The handle post 12 provides a handle 13 and a head light 14 at the upper portion thereof and also the front wheel 11 at the lower portion thereof through a front fork 15 of the tricycle front frame, in addition, a seat 16 for a rider is provided at the front frame 1.

A rear frame 2 has two rear wheels 24 and 25, which is composed of two opposite lower frames 21, 21' and an upper frame 22 connected to a forwardly crossed portion of the frames 21, 21', and is provided with a rear body 23 trailing to the same. In addition, the rear frame 2 is loading a suitable drive equipment, for example, a motor or other prime mover (not shown).

Figure 2:
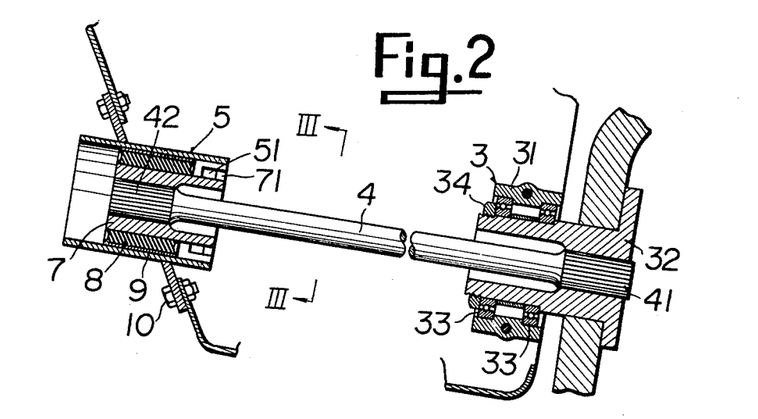
FIG. 2 is an enlarged longitudinally sectional view of the principal portion thereof.

The reference numeral 3 designates means for connecting both the frames 1 and 2, which comprises a housing 31 fixed rearwardly downwardly of the front frame 1 and a coupling shaft 32 pivotally supported with the housing 31 through bearings 33, 33 and fixed forwardly downwardly to the rear frame 2, whereby both the frames 1 and 2 are swingingly movably connected with each other in the axis line X—X extending longitudinally of the tricycle body by means of supporting the coupling shaft 32 to the housing 31. A lock nut 34 is attached to the coupling shaft 32.

An elastic member 4 is insertibly mounted between the frames 1 and 2 for permitting the front frame 1 to be restored from inclination thereof with respect to the rear frame 2, which mainly employs, as shown in FIG. 2, a torsion bar having a given elastic restoring force.

For being fully understood, the elastic member 4 of torsion bar will be described in the following.

The torsion bar 4 is disposed on the axis line X—X as aforegoing, and supported at the rear end thereof by means of a first supporting means composed of the abovementioned coupling shaft 32 and at the fore end thereof by means of a second supporting means.

The first supporting means supports the rear end of torsion bar in a manner that outer serrations 41 are formed at the torsion bar rear end and inner serrations are formed at the inner surface of a bore formed at the center of the coupling shaft 32 so that the former may be insertibly engaged with the latter, thereby fixing the rear end of torsion bar 4 integrally with the rear frame 2. Incidentally, the coupling shaft 32 may be engaged with the torsion bar 4 by means of a fixing bolt or welding or the like other than the above-mentioned serration engagement.

The second supporting means supports the fore end of the torsion bar 4 to the front frame 1 in a manner that the torsion bar is, reversely to solidly supporting it with the first supporting means, relatively swingingly movable within a given range so that the torsion bar 4 may not be substantially distorted within the predetermined range of inclination of the front frame 1 against the rear frame 2 but may be distorted over the same range.

The meaning of the above-mentioned "the torsion bar 4 may not be substantially distorted" is that this invention is directed to have two cases that the torsion bar 4 is not distorted to allow the front frame 1 to be applied with zero restoring force, and that the former is not distorted but a second elastic member is, as described hereinafter, used for being elastically distorted so that the restoring force of the front frame 1 becomes smaller. This construction will be clarified by the following description.

Figure 6:
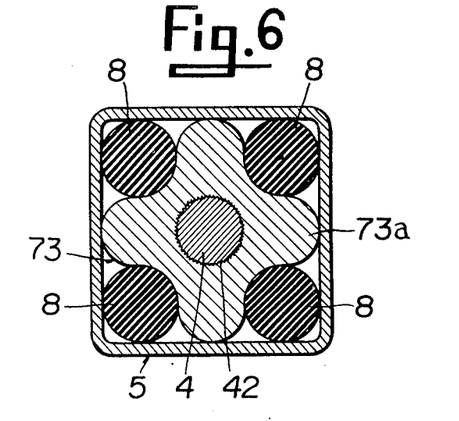
FIG. 6 is a sectional view of the principal portion of a modified embodiment.
Figures 7, 8:
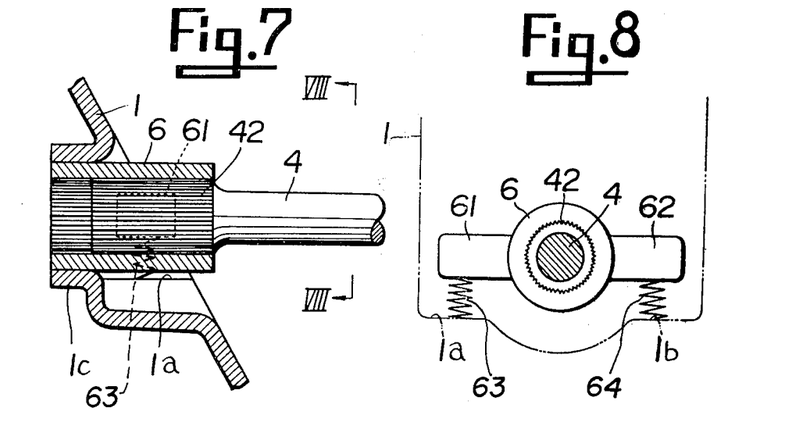
FIG. 7 is a longitudinally sectional view showing another modified embodiment.
FIG. 8 is a sectional view taken on Line VIII—VIII in FIG. 7.

There are various constructions supporting the fore end of the torsion bar 4 with the second supporting means, one of which is shown in FIGS. 7 and 8 and others of which are shown in FIGS. 2 through 4 and FIG. 6. Namely, the former construction is that the front frame 1 is provided with a bore 1c which constitutes the second supporting means so that the fore end of torsion bar 4 may be supported with the bore 1c in the relationship that the torsion bar becomes relatively rotatable with respect to the front frame 1, and with a pair of arms 61 and 62 symmetrically radially extending from the fore end of torsion bar, between which arms 61 and 62 and the front frame 1 are provided two stoppers for preventing the torsion bar from rotating over a given range. The latter is that the front frame 1 is provided with a fixed member 5 of a cylindrical or square pipe rigidly fixed thereto and the torsion bar 4 is provided at the fore end thereof with a pair of arms 71 and 72 radially extending therefrom, between which arms 71 and 72 and the fixed member 5 are provided stoppers for preventing the torsion bar 4 from rotating over a given range.

In the former construction, the most suitable embodiment will be described in detail in the following. The bore 1c is formed in a short cylindrical boss-like shape and outer serrations 42 are formed at the fore end of the torsion bar 4 for being unrotatably engageable with inner serrations formed at the inner surface of a cylindrical support 6 having a pair of arms 61 and 62 at the outer periphery thereof so that the support 6 may be rotatably insertibly supported with the boss portion of the front frame 1. Also, the front frame 1 is provided with two control portions 1a and 1b opposite to the arms 61 and 62 respectively. As a result, when swingingly leaned within a given range the front frame 1 can be freely swung without any interruption caused by the elastic restoring force of torsion bar 4, while, when over the same range the front frame 1 becomes in abutment at the control portions 1a and 1b thereof against either the arm 61 or 62 so as to make the torsion bar 4 elastically distorted, thereby applying resistance to the swinging movement of front frame 1, consequently, the torsion bar 4 becomes possible to apply a great restoring force to the rear frame 2.

It will be seen from this construction that between the arms 61 and 62 and the control portions 1a and 1b opposite thereto is provided a second elastic members having each smaller elasticity than that of the torsion bar 4, e.g., helical coiled springs, whereby when leaned within a given range the front frame 1 may be applied with a small restoring force thereto.

Figures 3, 4:
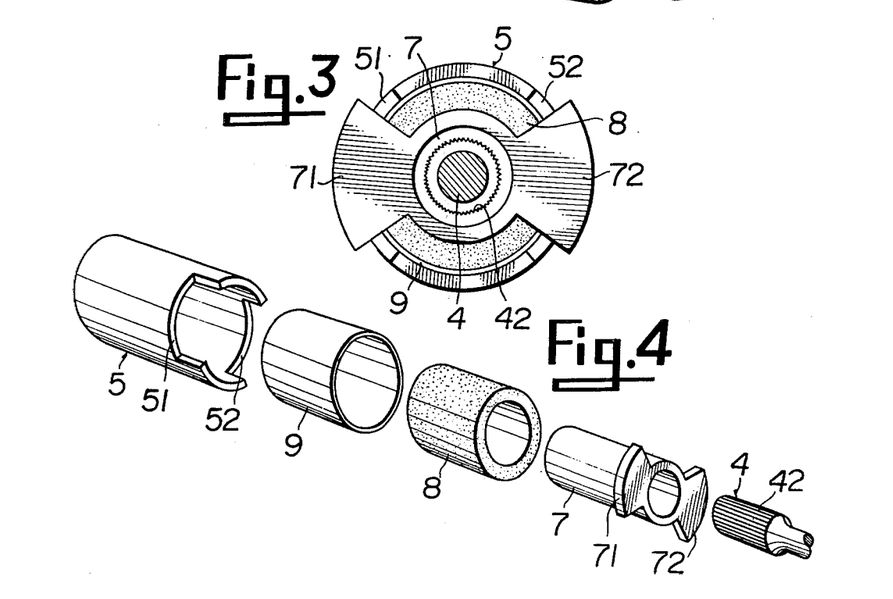
FIG. 3 is an enlarged sectional view taken on Line III—III in FIG. 2.
FIG. 4 is an exploded perspective view of the principal portion.

Next, the latter construction is as follows, that is, it is advantageous in manufacturing and functions more than the latter. A representative example employs, as is shown in FIGS. 2 through 4, the fixed member 5 of a cylinder-like shape. In this construction the fixed member 5 is preferably provided oppositely at both sides of one end thereof with two cutouts 51 and 52 larger in width than the arms 71 and 72, into which cutouts 51 and 52 are entered the arms 71 and 72 for being freely rotatably so that the front frame 1 may be permitted to be swingingly movable until arms 71 and 72 are in abutment at each widthwise one end surface thereof with one of both widthwise end surfaces of each of the cutouts 51 and 52. Incidentally, arms 71 and 72 are formed, as the same as the former construction, at the outer periphery of a support member 7 which is in serration engagement with the torsion bar 4.

Furthermore, in this construction, an elastic body 8 such as vulcanized rubber is provided between the fixed member 5 and the support 7, thus, when leaned within the predetermined range, that is, until arms 71 and 72 are in abutment against cutouts 51 and 52, the front frame is, as aforegoing, applied with a small restoring force. In addition, in FIGS. 2 through 4 a sleeve 9 is fixed onto the outer periphery of elastic body 8, and a fixing means 10 is composed of bolts and nuts for fixing the fixed member 5 to the front frame 1.

As shown in the exploded view in FIG. 4, the splined end 42 of shaft 4 is inserted into the cylindrical support 7 so as to secure these two components together. The annular elastic member 8 is inserted over and secured at its inner periphery to the cylindrical part 7, and sleeve 9 is inserted over and secured to the outer periphery of the elastic member 8. The sub-assembly of parts 42, 7, 8 and 9 is then inserted into the cylindrical member 5, and the sleeve 9 is secured to the inner periphery of member 5 by welding or similar means. Since the part 5 is fixed to the front frame 1, any rotation of the latter, in one direction or the other, as the rider leans in that direction when making a turn, will cause the annular elastic member 8 to distort rotationally and transmit the torque to member 7 and thence to shaft 4. After the cylindrical member 5 has been rotated through an angle sufficient to bring the arms 71, 72 into engagement with the ends of the cut-outs 51, 52, any further rotation of the cylindrical member 5 results in transmission of torque directly to the part 7 and thence directly to the end of shaft 4.

In FIG. 6 one of the latter constructions will be described, in which the fixed member 5 is formed of a square pipe and the torsion bar 4 is in serration engagement at the fore end thereof with a connecting member 73 of a star-like section with projections 73a as many as four corners of the fixed member 5, and also the connecting member 73 is insertibly mounted into the fixed member 5 and is insertibly provided with a rubbery elastic body 8 of a rod-like shape at each conner thereof and adjacent one side surfaces of each projection 73a, in this instance, the fixed member 5 and the connecting member 73 become relatively rotatable with each other from permissible contraction of the rubbery bodies 8 up to the critial elasticity thereof, thereafter, become solid integrally of each other at the same critical point, thus making it possible to function as the same as the construction of elastic body 8 in the abovementioned latter case.

A front frame leaning type tricycle in accordance with the invention is constructed as aforegoing, in which a rider steers a tricycle keeping his balance by unconsciously leaning himself inwardly of the curve when a turn is made, then a comparatively low running speed and a large radius of curvature may not cause overturn of the tricycle even one rear wheel 24 inward of the curve is less restricted from rise over the ground due to a small centrifugal force applied to the rear frame 2. On the coutrary, when the former increases or the latter is very small, the rear frame 2 is affected by an extremely great centrifugal force, therefore, the rear wheel 24 should be applied with a heavy anti-lifting strength.

In the present invention, while the rider leans himself inwardly of the curve the front frame 1 becomes to be swingingly leaned against the elasticity of the torsion bar 4 and elastic body 8. In this instance, when the front frame is swingingly leaned at an angle within a predetermined range in which either one of arms 61 and 62 leads to in abutment against either one of control portions 1a and 1b, or the arms 71 and 72 abut against each widthwise one end surface of cutouts 51 and 52, there occurs not at all the elastic distortion of the torsion bar, otherwise, the elastic member 8 becomes only elastically distorted. On the other hand, when inclination of the front frame 1 is over the predetermined range, either one of arms 61 and 62 is in abutment against either one of control portions 1a and 1b, and arms 71 and 72 against each widthwise one end surface of cutouts 51 and 52 so that the elastic body 8 may be prevented from further elastic distortion thereof, thereafter, further swinging inclination of the front frame is transmitted to allow the torsion bar 4 to be elastically distored.

For being fully understood, when leaned within the predetermined range the front frame 1 is permitted to be swingingly leaned without any elastic distortion or against the elastic restoring force caused by elastic distortion of the elastic body 8 only, at this time is zero or minimum the elastic restoring force so that the front frame may be less interrupted from being leaned, thereby easily turning the tricycle. On the other hand, when leaned over the predetermined range, the front frame 1 becomes to be applied with the elastic restoring force caused by the torsion bar 4 elastic distortion. At this time, the restoring force is so great that it is transmitted to the rear frame 2 through the torsion bar 4 for intensively downwardly urging one rear wheel 24 inside the curve and acting as so-called anti-lifting strength to restrict the rear frame 2 from inclination thereof, thereby preventing the tricycle from overturn thereof. Furthermore, the inclination of rear frame 2 caused by a far greater centrifugal force applied thereto, is transmitted to the front frame, namely a rider, through the torsion bar 4, that is, the torsional moment of the bar from the rear frame 2 inclination may be transmitted to the rider without being absorbed because of a great elastic restoring force of the bar, whereby the rider can prevent the rear frame from overturn thereof in such a step as immediately reducing the running speed or making larger the radius of curvature.

Figure 5:
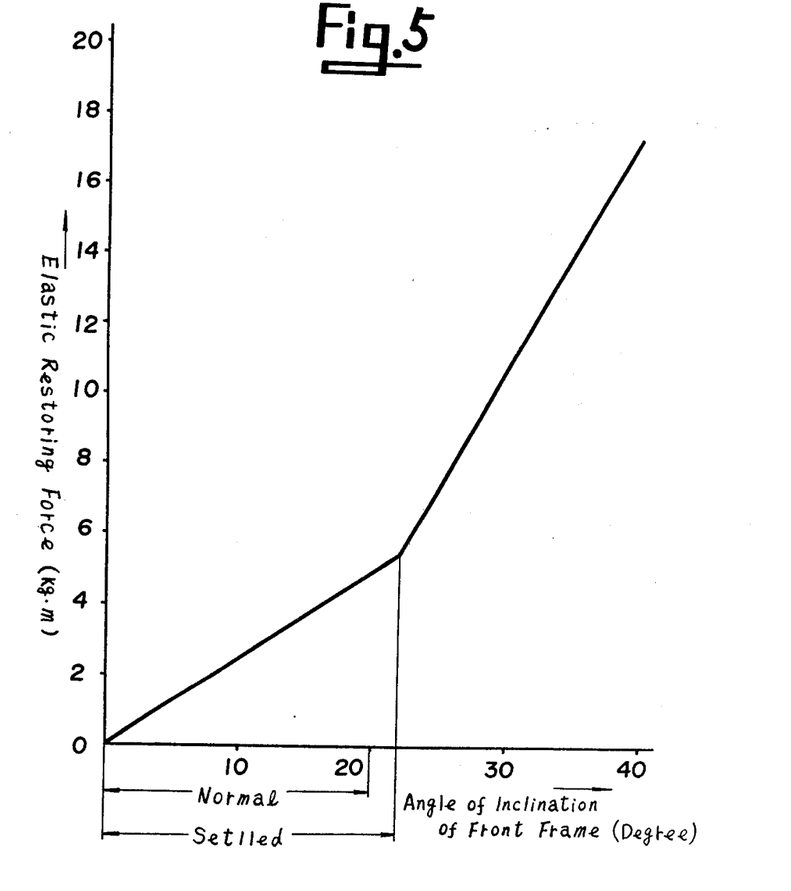
FIG. 5 is a graph showing spring characteristics in connection with the elastic restoring force and the angle of torsion.

From the result of experiments of actual products on a basis of the above-mentioned art of the invention, it has been confirmed that an elastic member has been preferred to have the features shown in a graph of FIG. 5.

The centrifugal force causing the overturn of rear frame depends upon the radius of curvature and running speed, however, in normal running, high speed of tricycle may not be applied for sharp turn, accordingly, the angle of inclination of front frame is usually from 0° to 20°, in which no overturn of the rear frame occurs. Consequently, there is no need for the rear frame to be applied with the elastic restoring force of the elastic member in normal running of tricycle but rather it is enough for the force to be applied at the instant that rear wheels tend to rise from the ground.

According to the above experiment, when an angle of inclination of the front frame is under about 22°, the increasing ratio of anti-lifting strength for rear wheels becomes minimum, and when the former is over the above degree, the latter becomes far greater to meet the abovementioned conditions so that the anti-overturn capability may be improved while a running turn is made without any interruption.

In the above-mentioned test product, the dimensions of components have been adopted as follows; a coupling of the front and the rear frame is about 197 mm high above the ground; an interval between the coupling and rear wheels about 530 mm long; that between both rear wheels about 460 mm long; each rear wheel about 200 mm long in radius; the rear frame about 80 kg in weight; the centroid thereof about 430 mm high above ground; and a torsion bar about 460 mm long and about 11.5 mm in diameter.

The tricycle of the invention which was designed under these conditions, fully satisfied us in the turning efficiency and the anti-overturn capability, where the increasing ratio of elastic restoring force of elastic member became larger from the starting point of an angle of about 22° as aforegoing, which angle is of course variable according to the size of tricycles.

In the above-mentioned constructions, when leaned right and left with respect to the rear frame 2 the front frame 1 is made to be bilaterally symmetrically equal in the restoring characteristics thereof, however, it is possible to be made not symmetrical.

Namely, it is possible that when leaned toward one rear wheel 25 driven by a prime mover, the front frame 1 becomes weak in the restoring force thereof, while, when toward the opposite side, the same becomes strong, thus becoming optimum for a single wheel driven type tricycle.

In this instance, when a turn is made, the effect from single wheel drive is off-set by function of elastic member bilaterally different in the elastic restoring force thereof, that is, when toward the opposite side to single driven rear wheel, a turn is easy due to the single wheel driven system, wherein the front frame must be swingingly leaned under a great resistance from the elastic member, thus, both leaning and resistance are balanced with each other, thereby enabling the tricycle to be turned in running equally right and left.

Such construction will be concretely described in the following. For instance, in FIGS. 7 and 8 helical coiled springs 63, 64 are disposed between the arms 61 and 62 and the control portions 1a and 1b respectively, whose spring constant is made to be variable to obtain the abovementioned object.

Figure 9:
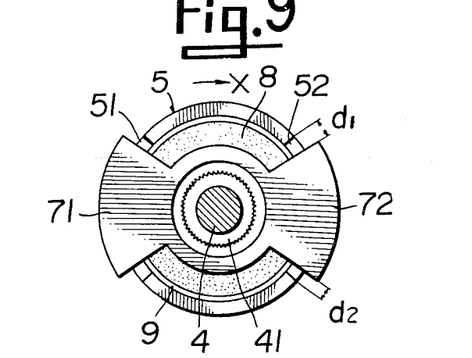
FIG. 9 is a sectional view of still another modified embodiment corresponding to FIG. 3.

In the construction in FIGS. 2 through 4, when the elastic member 8 is disposed between the fixed member 5 and the supporting member 7, clearances $d_1$ and $d_2$, at each of the cutouts 51 and 52 as shown in FIG. 9, between widthwise each one edge of cutouts 51 and 52 of the former and both edges in the rotary direction of arms 71 and 72 which are positioned within cutouts 51 and 52, are made different in width so that arms 71 and 72 are moved toward wider clearances $d_1$ when the front frame leans toward the single driven rear wheel 25, on the contrary, the arms are moved toward narrow clearances $d_2$ reversely when the front frame leans toward opposite side.

Figure 10:
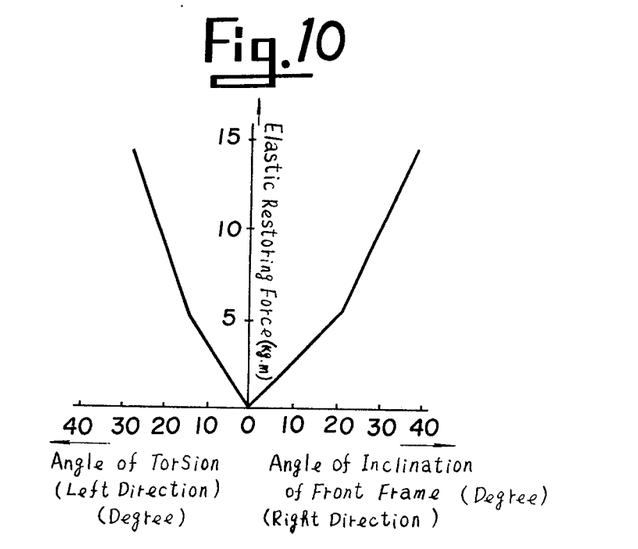
FIG. 10 is a graph showing spring characteristics of the embodiment in FIG. 9.

When a running turn is made toward the single driven rear wheel, the fixed member 5 rotates in the direction of the arrow X in accompanying with the front frame 1 inclination, wherein only the elastic member 8 is made to be elastically distorted because the arms 71 and 72 travel in the wide clearances $d_1$ until they become in abutment against each one of the edges of cutouts 51 and 52, conversely, when turned toward opposite side, arms 71 and 72 immediately abut against each of other edges of the cutouts because of the narrow width of clearances $d_2$ so that the torsion bar 4 as well as the elastic member has a bilaterally different multiple restoring force respectively, as shown in graph of FIG. 10, namely a different restoring force, when the front frame is leaned at a bilaterally symmetrically equal angle of inclination. Accordingly, the front frame may be swingingly leaned without any interruption when leaned toward single driven rear wheel and the same is affected by a heavy resistance so as to be hardly leaned when leaned toward the opposite side, that is to say, even a rider tries to lean the front frame in his feeling of steering the tricycle equally right and left, actually, the front frame leans in the former case more than in the latter case. However, in the latter case, the tricycle body is additionally applied with the turning acceleration based on single rear wheel drive, thus a heavy resistance upon the front frame becoming partially balanced with the acceleration, namely, the turning acceleration by single wheel drive may compensate hard leaning of the front frame as aforegoing, thereby enabling the rider to steer the tricycle in a feeling of turning it equally right and left.

The preceding description of the manner of operation is made on the assumption that the construction shown in FIG. 9 is utilized, and wherein the clearances $d_1$ and $d_2$ are unequal in a non-distorted condition of the elastic member 8. That is to say, when there is no rotary movement imparted to the part 5 due to leaning of the rider in either direction. The only difference between the constructions shown in FIGS. 3 and 9 is that in FIG. 3, the clearances $d_1$ and $d_2$ are equal in a non-distorted condition of elastic member 8.

While various embodiments of the invention have been shown and described, the invention is not limited to the specific construction thereof, which is merely exemplified in the specification rather than is defined.

What is claimed is:

1. A tricycle having one front wheel and two rear wheels, comprising,
   a. a front frame which is supported with said front wheel, said front frame having an operating handle for the front wheel and a seat for a rider,
   b. a rear frame which is supported with said two rear wheels, said rear frame being provided with a driving equipment for driving at least one of said rear wheels,
   c. connecting means for swingingly movably connecting said front frame and said rear frame with each other, said connecting means being directed in the axis line extending longitudinally of a tricycle body comprising said front frame and said rear frame,
   d. an elastic member insertibly mounted to be supported between said front frame and said rear frame, said elastic member serving to restore the front frame from being leaned with respect to the rear frame, and
   e. a first and a second supporting means for supporting both ends of said elastic member to said front and rear frame respectively, said first supporting means fixing one end of said elastic member to one of said front and rear frame, said second supporting means allowing the other end of said elastic member to be movable relatively to the other frame in a given range, said elastic member being substantially not elastically distorted within the given range but elastically distorted over the same range.

2. The tricycle according to claim 1, wherein said elastic member is formed of a torsion bar which is positioned longitudinally of the tricycle body so that the fore end of torsion bar may be supported with said second supporting means and the rear end of the same may be supported with said first supporting means.

3. The tricycle according to claim 1, wherein said elastic member is supported at one end thereof to one of said frames by means of said second supporting means so as to be relatively movable with respect to said frame, and between said frame and said elastic member are provided stoppers restricting said elastic member from being moved in excess of a given range, whereby when moved within the given range the elastic member is not elastically distorted so as to make zero the increasing ratio of the elastic restoring force of said frame, while, when in abutment against stoppers said elastic member is distorted to make large said ratio.

4. The tricycle according to claim 3, wherein a torsion bar is used as said elastic member, said torsion bar being supported at lengthwise one end thereof to said frame in the relationship that the bar is relatively rotatable with respect to said frame and being provided at lengthwise one end of the bar with a pair of arms extending radially of said bar, and between said arms and said frame are provided stoppers for restricting said arms from rotating over the predetermined range.

5. The tricycle according to claim 3, wherein said stoppers are formed of two control portions at a portion of said frame opposite to said arms.

6. The tricycle according to claim 4, wherein a cylindrical support member is fixed to one end of said torsion bar, said support member being provided at the outer periphery thereof with a pair of arms extending radially of said support member, and being swingingly rotatably mounted to said frame.

7. The tricycle according to claim 4, wherein a hollow fixed member is fixed to said frame to insertibly support thereto said torsion bar at lengthwise one end thereof, and between said fixed member and said pair of arms are provided stoppers for restricting said arms from rotating over the predetermined range.

8. The tricycle according to claim 7, wherein said fixed member is formed in a cylindrical shape and provided with cutouts of each given length, said cutouts receiving said arms therein so that said arms may be relatively rotatable with respect to said fixed member within said cutouts respectively.

9. The tricycle according to claim 1, wherein said elastic member is supported at one end thereof to one of said frames through said second supporting means so that said elastic member may be relatively movable with respect to said frame, and between said frame and said elastic member are provided stoppers for restricting said elastic member from movement in excess of the predetermined range and are insertibly mounted a second elastic member of a smaller elasticity than that of said elastic member, whereby when said front frame is swingingly moved to generate relative movement with respect to said elastic member said second elastic member only becomes distorted to make minimum the increasing ratio of elastic restoring force of front frame and when said stoppers act due to the front frame swinging over the predetermined range said elastic member is made to be distorted so as to make large the increasing ratio of elastic restoring force of the front frame.

10. The tricycle according to claim 9, wherein a torsion bar is used as said elastic member, said torsion bar being supported at lengthwise one end thereof to said frame in the relationship that said torsion bar becomes relatively rotatable with respect to said frame and also being provided at lengthwise one end of the bar with a pair of arms extending radially of the bar, and between said arms and said frame are provided stoppers for restricting said arms from rotating thereof over the predetermined range and also is provided said second elastic member.

11. The tricycle according to claim 10, wherein said stoppers are formed of two control portions at a frame opposite to said frame and a second elastic member is insertibly mounted between said arms and said control portions.

12. The tricycle according to claim 10, wherein a hollow fixed member is fixed to said frame, into which the torsion bar is insertibly mounted at lengthwise one end thereof, and between said fixed member and said pair of arms at said torsion bar are provided stoppers for restricting said arms from rotating over the predetermined range, and said second elastic member is insertibly mounted between said fixed member and said arms.

13. The tricycle according to claim 12, wherein said fixing member is formed in a cylindrical shape and provided with cutouts of each given length, said cutouts receiving said arms therein so that said arms may be relatively rotatable with respect to said fixed member within said cutouts respectively.

14. The tricycle according to claim 13, wherein a support member of a cylindrical shape is fixed to lengthwise one end of the torsion bar, a pair of arms extending radially of the bar are formed at the outer periphery of said support member, said support member is insertibly mounted into said fixed member, and a second elastic member is insertibly mounted between said fixed member and the outer periphery of said support member.

15. The tricycle according to claim 9, wherein a torsion bar is used as said elastic member, a fixed member formed of a square pipe is fixed to said frame, at lengthwise one end of the bar is fixedly provided a connecting member of star-like section with projections as many as corners of said fixed member, and a second elastic member is insertibly mounted into each space surrounded with adjacent projections and one of said corners.

16. The tricycle according to claim 9, wherein a rubbery elastic member is used as said second elastic member.

17. The tricycle according to claim 1, wherein the elastic restoring property of the front frame is made bilaterally non-symmetrical so that the front frame becomes weak in the elastic restoring force thereof when leaned toward one rear wheel cooperable with the driving equipment, while, strong when leaned toward the opposite side.

18. The tricycle according to claim 9, wherein the spring constant of said second elastic member is made variable every inclining direction of the front frame with respect to the rear frame so that when the front frame is leaned toward one rear wheel cooperable with the driving equipment the spring constant of said second elastic member may become small, while, when leaned toward the opposite side the same may become large.

19. The tricycle according to claim 13, wherein clearances formed between end surfaces at both sides in the rotary direction of said arms and lengthwise end surfaces of said cutouts, are made large and small in width respectively so that when the front frame is leaned toward one rear wheel cooperable with the driving equipment the arms rotate with respect to said fixed member within the large clearance, while when leaned toward opposite side the arms similarly rotate within the small clearance.

* * * * *